Figures 1, 2, 3, 4:
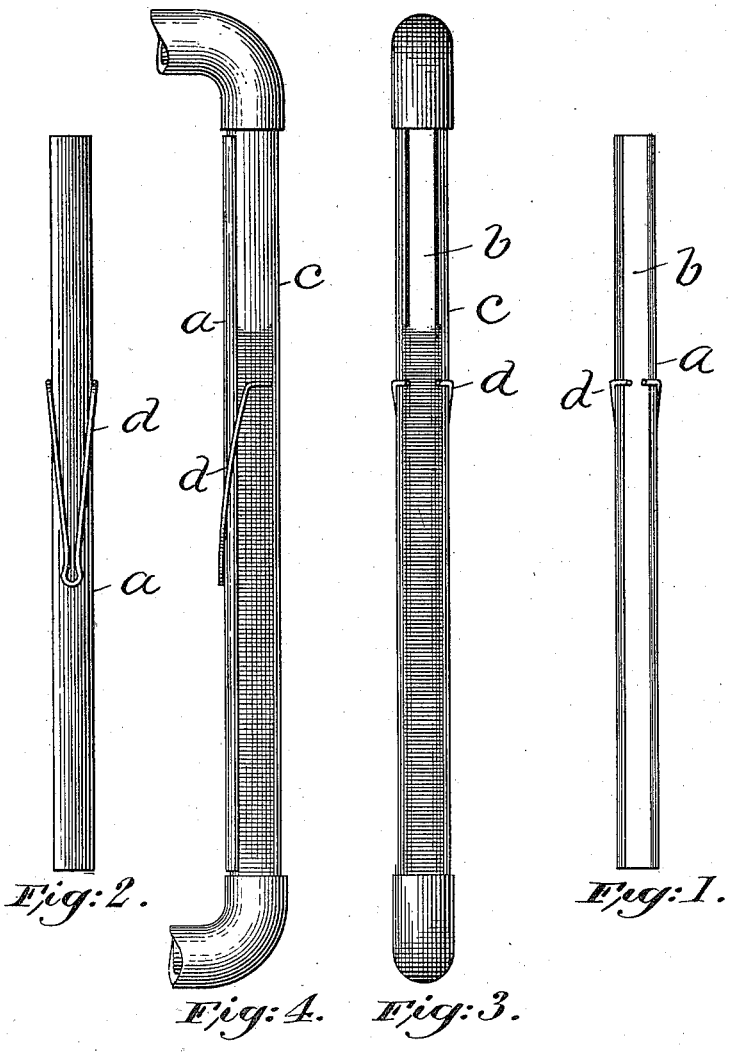

(No Model.)

C. A. JEWETT & C. B. WOOD.
ATTACHMENT FOR WATER GAGES.

No. 579,345. Patented Mar. 23, 1897.

Witnesses:
Arthur J. Randall
C. C. Stecher

Inventors:
Chas. A. Jewett,
Clark B. Wood,
By Arthur W. Crossley

UNITED STATES PATENT OFFICE.

CHARLES A. JEWETT AND CLARK B. WOOD, OF BOSTON, MASSACHUSETTS.

ATTACHMENT FOR WATER-GAGES.

SPECIFICATION forming part of Letters Patent No. 579,345, dated March 23, 1897.

Application filed August 12, 1895. Serial No. 559,082. (No model.)

*To all whom it may concern:*

Be it known that we, CHARLES A. JEWETT and CLARK B. WOOD, of Boston, in the county of Suffolk and State of Massachusetts, have invented certain new and useful Improvements in Attachments for Water-Gages, of which the following is a specification.

This invention has relation to water-gages used in connection with steam-boilers and other apparatus or contrivances in which water is used for the purpose of indicating the height or quantity of water in the boiler or water tank or receptacle.

It is the object of the invention to provide an attachment for the glass of the water-gage which shall operate to render more distinct and clear the water-line in the glass than is the case at present without the said attachment.

To these ends the invention consists of an attachment for the glasses of water-gages embodying in its construction a strip of sheet metal or other suitable material adapted to rest against the glass and faced with white asbestos paper or paint or other substance adapted to magnify or render more distinct and clear the water-line in the glass, the said strip being provided with spring-fingers or equivalent devices to enable it to be readily connected with and disconnected from the glass, all as we will now proceed to more fully describe and claim.

Reference is to be had to the annexed drawings, and to the letters marked thereon, forming a part of this specification, the same letters designating the same parts or features, as the case may be, wherever they occur.

Of the drawings, Figure 1 is a front view of the invention detached. Fig. 2 is a rear view of the same. Fig. 3 is a front view of the invention applied to the glass of a water-gage. Fig. 4 is a side view of the same.

In the drawings, $a$ designates a strip of sheet metal or other suitable material faced on its front side at $b$ with white asbestos paper or paint or other substance calculated to magnify or render more distinct and clear the water-line in a glass tube against which the face of the strip may be placed.

$c$ designates the glass of a water-gage, which is usually constructed as a round tube, and which glass is so connected with the boiler or other water-receptacle as to indicate the height of the water therein.

$d$ designates spring-fingers soldered or otherwise connected at one of their ends with the strip $a$ and adapted at their free ends to embrace the glass and hold the strip in place thereon, as is shown in Figs. 3 and 4. The said spring-fingers are preferably formed of a single wire bent into V shape, with the free ends bent and curved so as to embrace the glass, the bent end being secured to the strip $a$ about centrally thereof. With this construction it will be seen that the strip $a$ can be most readily connected with and detached from the glass $c$ and that it may be adjusted at any desired position on the glass, and by curving the strip in cross-section its face may be made to rest closely against the glass. The white asbestos facing $b$ or facing of other equivalent substance serves the purpose of magnifying or rendering more distinct the water-line in the glass, so that it can the more readily and certainly be seen and mistakes and dangers incident to the variation in amount of water in a boiler or the like avoided.

It is to be noted that our invention is exceedingly simple in construction, inexpensive of manufacture, and is most easily applied and removed from the water-glass.

The luminous face of the strip and the spring-fingers by which it is rendered readily attachable and detachable are important features of the invention.

Having thus explained the nature of the invention and described a way of constructing and using the same, though without attempting to set forth all of the forms in which it may be made or all of the modes of its use, it is declared that what is claimed is—

An attachment for glass tubes of water-gages, comprising in its construction, a strip of sheet metal curved in cross-section to adapt it to fit upon the back of the gage-tube, said strip being faced with a strip of luminous paper, and spring-fingers formed of a single wire bent into V shape and having its bent end secured to the back of the sheet metal, and its free ends bent to embrace the gage-tube, whereby the attachment may be readily attached to and detached from the gage-tube.

In testimony whereof we have signed our names to this specification, in the presence of two subscribing witnesses, this 26th day of July, A. D. 1895.

CHARLES A. JEWETT.
CLARK B. WOOD.

Witnesses:
ARTHUR W. CROSSLEY,
WM. H. FIELD.